United States Patent Office 3,507,966
Patented Apr. 21, 1970

3,507,966
SEDATIVE-HYPNOTIC AGENTS
Winfried Arnold, Brugglestrasse 9, 4104 Oberwil, Switzerland, and Frank H. Clarke, Jr., 14 Long Pond Road, Armonk, N.Y. 10504
No Drawing. Continuation-in-part of application Ser. No. 638,582, May 15, 1967. This application Mar. 4, 1969, Ser. No. 804,325
Int. Cl. A61k 27/00
U.S. Cl. 424—343                   12 Claims

ABSTRACT OF THE DISCLOSURE

Method of effecting a sedative-hypnotic response in a warm-blooded animal containing a trihaloglycol and compositions for that method. An illustrative embodiment is a composition containing 1,1,1-trichloro-2,3-dihydroxypropane.

CROSS-REFERENCE

This is a continuation-in-part of copending applications, Ser. No. 550,595, filed May 17, 1966 now abandoned, Ser. No. 638,581, filed May 15, 1967 and Ser. No. 638,582, filed May 15, 1967 now abandoned.

DETAILED DISCLOSURE

The present invention pertains to a method of and compositions for effecting a sedative-hypnotic response in warm-blooded animals especially mammals. In particular, the invention involves the administration of compound of the formula

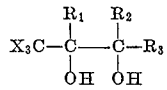

wherein

X is chloro or bromo; and
each of $R_1$, $R_2$ and $R_3$ independently is hydrogen or methyl.

The following compounds are preferably administered for obtaining the above-described effects; 1,1,1-trichloro-2,3-dihydroxypropane; 1,1,1-tribromo - 2,3 - dihydroxypropane; dl-threo-1,1,1-trichloro - 2,3 - dihydroxybutane; dl-erythro-1,1,1-trichloro-2,3-dihydroxybutane; and 1,1,1-trichloro-2-methyl-2,3-dihydroxypropane.

These compounds can be administered to warm-blooded animals, particularly mammals, to elicit a hypnotic-sedative response. They are thus useful in treating various disorders such as sleeplessness, tension, irritability, convulsion, and the like. Advantageously, they do not inhibit the metabolism of alcohol. Moreover, they are free of post-administrative side-effects.

The trihaloglycols of Formula I demonstrate the properties of effecting a sedative-hypnotic response in warm-blooded animals when administered orally or parenterally, and can also be used for effecting soporific, anticonvulsant, pre-anesthetic, and muscle-relaxant effects in warm-blooded animals. The preferred route of administration is the oral route. These properties can be conveniently observed in the laboratory model in such art-recognized tests as strychnine seizures, electro-shock seizure, deterring the loss of righting reflux or merely by administering the compounds and determining the duration of sleep.

On pretreatment with 1,1,1-trichloro-2,3-dihydroxypropane on seizures induced by pentylenetetrazone, a delay in the occurrence of convulsions can be observed in mice at doses of 150 mg./kg. and 300 mg./kg. p.o.

Hypnosis is observed in mice for about 2 hours on intraperitoneal administration of 310 mg./kg. and on oral administration of 780 mg./kg. of 1,1,1-tribromo-2,3-dihydroxypropane.

For use as sedative-hypnotic agent, the trihalo-glycols are incorporated in compositions suitable for oral administration to animals in solid and liquid unit dosage forms, such as tablets, capsules, powders, granules, syrups, elixirs, and the like. The term unit dosage form as used in this specification and claims refers to physically discrete units suitable as unitary dosages for animals, each unit containing a predetermined quantity of active material calculated to produce the desired therapeutic effect in association with the required pharmaceutical diluent carrier or vehicle.

Powders are prepared by comminuting a trihaloglycol to a suitably fine size and mixing with a similarly comminuted diluent. The diluent can be an edible carbohydrate material such as starch. A sweetening agent or sugar may also be present as well as flavoring oil.

Granules for reconstitution into a liquid oral preparation are prepared utilizing water-soluble diluents. A powder mixture of the finely divided compound and a water-soluble diluent such as sucrose, glucose, and the like is wetted with a binder such as acacia muscilage, gelatin solution, methyl-cellulose solution and forced through a screen to form granules which are allowed to dry. A suspending agent such as tragacanth may be included in the composition.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into slugs. The slugs can be lubricated to prevent sticking to the tablet forming dies by means of the addition of stearic acid, a stearate salt, talc, or mineral oil. The lubricating mixture is then compressed into tablets. A protective coating consisting of a sealing coat of shellac, a coating of sugar and methylcelluose, and a polish coating of carnauba wax may be provided.

Oral fluids are prepared in unit dosage forms such as syrups and elixirs wherein each teaspoonful of composition contains a predetermined amount of the compound for administration.

A syrup is prepared by suspending the compound in a suitably flavored aqueous sucrose solution. Similarly, an elixir is prepared utilizing a nontoxic alcohol vehicle.

For parenteral administration, aqueous and oleaginous fluid unit dosoge forms can be prepared. In preparing the parenteral form, a measured amount of the compound is placed in a vial, the vial and its contents sterilized and sealed. An accompanying vial of sterile water may be provided as a vehicle to form a suspension prior to administration. Particularly suitable for parenteral administration are the addition salts of the compounds of Formula I.

The amount of these compounds which is administered in use to effect a sedative-hypnotic response must in all cases be adjusted to the animal being treated, its age, weight, and condition as well as the degree of response required. Thus while a sedative-hypnotic response is observed for these compounds at dosages as low as 1 mg./kg., the compounds are tolerated and can be used in much higher dosages. For instance, the acute toxicity of 1,1,1-trichloro-2,3-dihydroxypropane is more than 800 mg./kg. in a single dose administered orally to rats. The actual dose for any particular mammal involved should, of course, be carefully titrated to the condition and response observed in accordance with well-recognized principles of pharmacology. A suitable dosage range in patients is from about 1 mg./kg. to about 50 mg./kg.

The compounds of Formula I as used in the compositions can be prepared according to or in analogy of the process described by Colonge and Lartigan: Bul. Soc. Chim. Fr. 1964, 2436.

Substituted 1,1,1 - trihalo - 2,3-dihydroxypropanes can also be prepared by:

(I) Reacting either alkyl 1,1,1-trichloro pyruvate or the 1,1,1-trichloro pyruvic acid with Grignard reagent and reducing the thus formed alkyl 1,1,1-trichloro-2-alkyl lactate or 1,1,1-trichloro-2-alkyl lactic acid by means of a reducing agent like, for instance, lithium aluminum hydride, lithium boro hydride, zinc aluminum hydride and the like; or (II) Reacting the appropriately substituted propargyl alcohol with mercuric acetate, and halogenating the thus formed mercuric acetate complex and obtaining the appropriately alkyl substituted 1,1,1 - trihalo- -3-acetoxy-2-keto-propane. Reduction of this intermediate gave the appropriately substituted 1,1,1-trihalo-2,3-dihydroxypropane; or (III) Alternatively reacting cis- and trans - 1,1,1-trihalo-2-alkenes with hydroxylating agents to yield either the threo- or the erythro isomers of the end product. As hydroxyating agents osmium tetroxide, permanganates, per-acids such as per-acetic acid can be used. The starting materials are either available or can be made by reacting substituted alkynes containing a terminal acetylene group with mercuric acetate, halogenating the thus obtained mercuric acetate complex, reducing the 1,1,1-trihalo-2-keto alkanes to their corresponding carbinols and subjecting the latter to dehydrogenation procedures to yield the desired trihaloalkenes.

(IV) Reacting the appropriately substituted 1,1,1-trihalo-3-acetoxy-propane-2-one with an appropriate Grignard reagent or alkyl lithium and hydrolyzing the intermediate to yield the claimed compounds.

According to the present invention, compounds where two asymmetric carbon atoms are present, for instance, 1,1,1-trichloro-2,3-dihydroxybutane, there are two geometrical isomers (diastereoisomer), (the erythro and threo forms); both of these isomers can be resolved into their optical isomers. For instance, the two diastereoisomers of 1,1,1-trichloro-2,3 - dihydroxybutane can be separated into dl-threo - 1,1,1 - trichloro - 2,3 - dihydroxybutane and dl-erythro-1,1,1-trichloro - 2,3 - dihydroxybutane both of which exhibit similar pharmacological effects.

The following examples describe compositions containing compounds of Formula I by way of illustration of, but not limitation on the scope of the present invention.

Example 1.—Tablet

Ingredient: Quantity, mg.
1,1,1 - trichloro - 2,3 - dihydroxypropane _____ 400
Corn starch U.S.P. _____ 50
Lactose U.S.P. _____ 40
Cab-O-Sil M-5 _____ 4
Gelatin U.S.P. _____ 5
Magnesium stearate U.S.P. _____ 1

The above ingredients, after being thoroughly mixed, are pressed into single scored tablets.

Example 2.—Tablet

Ingredient: Quantity, mg.
1,1,1 - trichloro - 2,3 - dihydroxypropane _____ 800
Corn starch U.S.P. _____ 50
Lactose U.S.P. _____ 40
Cab-O-Sil M-5 _____ 4
Gelatin U.S.P. _____ 5
Magnesium stearate U.S.P. _____ 1

The above ingredients, after being thoroughly mixed, are pressed into single scored tablets.

Example 3.—Suppositories

Ingredient: Quantity, mg.
1,1,1-trichloro-2,3-dihydroxypropane _____ 500 in a non-irritating base of spermaceti, beeswax, or petrolatum.

Example 4.—Aqueous solution

10% aqueous solution of 1,1,1-trichloro-2,3-dihydroxypropane is used for parenteral administration.

Example 5.—Capsule

Ingredient: Quantity, mg.
1,1,1-tribromo-2,3-dihydroxypropane _____ 200

The above ingredient is introduced into a two-piece hard gelatin No. 1 capsule.

Example 6.—Tablet

Ingredient: Quantity, mg.
1,1,1-tribromo-2,3-dihydroxypropane _____ 300
Corn starch U.S.P. _____ 50
Lactose U.S.P. _____ 40
Cab-O-Sil M-5 _____ 4
Gelatin U.S.P. _____ 5
Magnesium stearate U.S.P. _____ 1

The above ingredients, after being thoroughly mixed, are pressed into single scored tablets.

Example 7.—Tablet

Ingredient: Quantity, mg.
1,1,1-tribromo-2,3-dihydroxypropane _____ 600
Corn starch U.S.P. _____ 50
Lactose U.S.P. _____ 40
Cab-O-Sil M-5 _____ 4
Gelatin U.S.P. _____ 5
Magnesium stearate U.S.P. _____ 1

The above ingredients, after being thoroughly mixed, are pressed into single scored tablets.

Example 8.—Suppository

Ingredient: Quantity, mg.
1,1,1-bromo-2,3-dihydroxypropane _____ 300 in a non-irritating base of spermaceti, white beeswax, or petrolatum.

Example 9.—Aqueous solution

A 5% aqueous solution of 1,1,1-tribromo-2,3-dihydroxypropane is used for parenteral administration.

Example 10.—Capsule

Ingredient: Quantity, mg.
1,1,1-trichloro-2,3-dihydroxybutane _____ 200
Corn starch U.S.P. _____ 200

The foregoing ingredients are mixed thoroughly and introduced into a two-piece No. 1 hard gelatin capsule.

What is claimed is:

1. A sedative-hypnotic pharmaceutical composition for internal administration comprising in a dosage unit form a solid or sterile aqueous pharmaceutical carrier and a compound of the formula

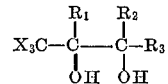

wherein X is chlorine or bromine and each of $R_1$, $R_2$ and $R_3$ is hydrogen or methyl, said compound being present in an amount sufficient to effect sedation.

2. A sedative-hypnotic pharmaceutical composition as defined in claim 1 wherein said compound is present in an amount sufficient to supply a single or multiple administration dose of from about 1 mg./kg. to about 50 mg./kg. of body weight.

3. A sedative-hypnotic pharmaceutical composition as defined in claim 2 wherein said compound is 1,1,1-trichloro-2,3-dihydroxypropane.

4. A sedative-hypnotic pharmaceutical composition as defined in claim 2 wherein said compound is dl-threo-1,1,1-trichloro-2,3-dihydroxybutane.

5. A sedative-hypnotic pharmaceutical composition as defined in claim 2 wherein said compound is dl-erythro-1,1,1-trichloro-2,3-dihydroxybutane.

6. A sedative-hypnotic pharmaceutical composition as defined in claim 2 wherein said compound is 1,1,1-tribromo-2,3-dihydroxypropane.

7. A method of producing a sedative-hypnotic effect which comprises administering to an animal or human a sedative-hypnotic dose of a compound of the formula

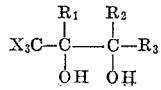

wherein X is chlorine or bromine and each of $R_1$, $R_2$ and $R_3$ is hydrogen or methyl.

8. The method as defined in claim 7 wherein said compound is administered in a dose of from about 1 mg./kg. to about 50 mg./kg. of body weight.

9. A method as defined in claim 8 wherein the compound is 1,1,1-trichloro-2,3-dihydroxypropane.

10. A method as defined in claim 8 wherein the compound is dl-threo-1,1,1-trichloro-2,3-hydroxybutane.

11. A method as defined in claim 8 wherein the compound is dl-erythro-1,1,1-trichloro-2,3-dihydroxybutane.

12. A method as defined in claim 8 wherein the compound is 1,1,1-tribromo-2,3-dihydroxypropane.

References Cited

Colonge et al., Bull. Soc. Chim. Fr., 1964, pp. 2436–2439.

ALBERT T. MEYERS, Primary Examiner

J. D. GOLDBERG, Assistant Examiner

U.S. Cl. X.R.

260—633